(12) United States Patent
Annic

(10) Patent No.: US 7,843,935 B2
(45) Date of Patent: Nov. 30, 2010

(54) SYSTEM AND METHOD FOR RESOURCE MANAGEMENT IN A TERMINAL CONNECTED TO A COMMUNICATION NETWORK

(75) Inventor: Etienne Annic, Rambouillet (FR)

(73) Assignee: Orange France, Montrouge (FR)

( * ) Notice: Subject to any disclaimer, the term of this patent is extended or adjusted under 35 U.S.C. 154(b) by 1547 days.

(21) Appl. No.: 10/540,953

(22) PCT Filed: Dec. 22, 2003

(86) PCT No.: PCT/FR03/03947

§ 371 (c)(1), (2), (4) Date: Jun. 27, 2005

(87) PCT Pub. No.: WO2004/062296

PCT Pub. Date: Jul. 22, 2004

(65) Prior Publication Data

US 2007/0015502 A1  Jan. 18, 2007

(30) Foreign Application Priority Data

Dec. 26, 2002  (FR) ................................ 02 16751

(51) Int. Cl.
 *H04L 12/56* (2006.01)
(52) U.S. Cl. .................... 370/395.2; 370/465
(58) Field of Classification Search ............... 370/465, 370/352, 353; 455/425
 See application file for complete search history.

(56) References Cited

U.S. PATENT DOCUMENTS

| 5,940,828 A * | 8/1999 | Anaya et al. ............ 707/8 |
| 6,249,836 B1 * | 6/2001 | Downs et al. ............ 710/268 |
| 6,714,946 B1 * | 3/2004 | Kanai et al. ............ 707/104.1 |
| 7,039,031 B1 * | 5/2006 | Joeressen ............ 370/337 |
| 7,257,815 B2 * | 8/2007 | Gbadegesin et al. ............ 718/104 |
| 2002/0085516 A1 * | 7/2002 | Bridgelall ............ 370/329 |
| 2004/0062262 A1 * | 4/2004 | Venteicher et al. ............ 370/431 |

FOREIGN PATENT DOCUMENTS

| EP | 1 251 706 A | 10/2002 |
| GB | 2 362 544 A | 11/2001 |

* cited by examiner

*Primary Examiner*—Chirag G Shah
*Assistant Examiner*—Daniel Mitchell
(74) *Attorney, Agent, or Firm*—Cohen Pontani Lieberman & Pavane LLP

(57) ABSTRACT

A system for managing a resource in a terminal (10) for an architecture (15, 15') dedicated to a communications network. The system includes a dedicated architecture resource manager (16, 16') adapted to process a request for a resource of the dedicated architecture (15, 15') defined by a process manager (17, 17') of the dedicated architecture (15, 15') as a function of an application activated on the terminal (10) and to dialogue with a resource administrator (14) of a dedicated architecture manager (13) to manage a resource of the terminal (10) and to process simultaneously the operation of the dedicated architectures (15, 15') of the terminal (10) that are connected to a plurality of the communications networks. Application to the management of resources allocated to a communications network from a set of communications networks each offering a set of services via a dedicated architecture (15, 15') integrated in a terminal (10) connected to a public mobile network to which the user is a subscriber.

8 Claims, 2 Drawing Sheets

SYSTEM AND METHOD FOR RESOURCE MANAGEMENT IN A TERMINAL CONNECTED TO A COMMUNICATION NETWORK

RELATED APPLICATIONS

This is a U.S. National Phase Application under 35 USC 371 of International Application PCT/FR2003/003947, filed on 22 Dec. 2003.

FIELD OF THE INVENTION

The present invention relates to a system and a method for resource management in a terminal connected to a communications network.

The invention applies more particularly to managing resources assigned to a communications network amongst a set of communications networks, each offering a set of services via a dedicated architecture integrated in a terminal connected to a public mobile network to which the user is a subscriber.

BACKGROUND OF THE INVENTION

At present, such services are accessible from a terminal connected to mobile telecommunications networks such as GPRS (General Packet Radio Service) networks and UMTS (Universal Mobile Telecommunication System) networks.

In those mobile networks, to select a communications network offering services, it is necessary to select a name identifying the communications network. To set up a connection between a terminal and a particular communications network, the identifying name is sent via a service support equipment of the mobile network to an equipment managing access to the communications networks. The identifying name, coming from the terminal, enables the service support equipment of the mobile network to determine the access management equipment associated with the identifying name that offers access to the communications network.

In existing GPRS and UMTS networks, the name identifying a communications network is called its access point name (APN). An APN primarily comprises an identifier that corresponds to the selected communications network, an identifier of the operator managing that communications network, and an identifier of the technology of the mobile network, for example GPRS technology. The format and use of an APN are covered by standards issued by the European Telecommunications Standards Institute (ETSI).

To access a communications network offering a set of services, the user selects an APN on the terminal in order to set up a connection with the corresponding communications network.

Once an APN has been selected on the terminal, an access protocol is initialized. In a GPRS or a UMTS network, this protocol is the Packet Data Protocol (PDP). A procedure is executed to set up a connection from the terminal to the access management equipment known as a gateway GPRS support node (GGSN). To enable the connection to be set up, a link to the selected communications network is created across the mobile network. In a GPRS or a UMTS network, this link is called a PDP context link. It enables the terminal to access the services of the communications network.

The ETSI standard provides for a plurality of connections to be set up simultaneously from the same terminal to different communications networks. The document FR 02/07457 describes the use of a dedicated architecture manager in a terminal to manage simultaneous access to a plurality of communications networks.

In that document, on establishing a connection to a communications network, the dedicated architecture manager dialogues with the communications network. In the terminal, the dedicated architecture manager designates a dedicated architecture which is allocated to the connection to the connected communications network. On setting up each new connection to a new communications network, the dedicated architecture manager designates a different dedicated architecture which is allocated to the connection to the new communications network. The various dedicated architectures in the same terminal operate simultaneously. Each dedicated architecture is associated with a PDP context link and provides access to a different communications network.

The above document mentions that the dedicated architecture manager in a terminal assigns each dedicated architecture to a communications network. The autonomy and independent operation of the dedicated architectures of the terminal guarantee mutual confidentiality and security between the communications networks by providing a "seal" between the various services connected to the terminal.

To maintain the independence of the various communications networks effectively, and because of the autonomy of the various dedicated architectures of a terminal, each dedicated architecture has no view of the operation of the other dedicated architectures of the terminal.

SUMMARY OF THE INVENTION

One object of the present invention is to provide a system and a method for managing a resource in a terminal for at least one architecture that is dedicated to one particular communications network, which system and method eliminate the drawbacks of existing systems by managing the various dedicated architectures of a single terminal.

This and other objects are attained in accordance with one aspect of the present invention directed to a system for managing a resource in a terminal for an architecture dedicated to a communications network. The system comprises a dedicated architecture resource manager adapted to process a request for a resource of said dedicated architecture and to dialogue with a resource administrator of a dedicated architecture manager to manage a resource of said terminal and to process simultaneously the operation of said dedicated architectures of said terminal that are connected to a plurality of said communications networks.

The dedicated architecture manager of the terminal manages simultaneous operation of the various architectures dedicated to the various communications networks to which said terminal is connected.

Thus each dedicated architecture of said terminal communicates with only one communications network, i.e. the communications network associated with the corresponding PDP context link, even if said terminal is connected to a plurality of communications networks.

When the user of the terminal wishes to access a service accessible via one of said connected communications networks and associated with one of said dedicated architectures, the user activates an application on the terminal. As a function of the required service, said application can take the form of a browser for reading a web page, a video player, an analog or digital sound player, etc.

In the terminal, said application is associated with the architecture dedicated to the communications network concerned. In said dedicated architecture, a dedicated architecture resource manager processes a resource request associated with the execution of said application.

Said dedicated architecture resource manager sends said resource request to said dedicated architecture manager of the terminal to verify the feasibility of said resource request and its compatibility with the other dedicated architectures and with the available resources of the terminal.

This preserves separate and autonomous operation of the various dedicated architectures of the terminal, which guarantees the mutual confidentiality and security of the various communications networks to which said terminal is connected. These imperatives are particularly important during a banking transaction or on connecting to a business private network, for example.

According to an embodiment of the invention, said dedicated architecture resource manager includes an interface for exchanging information with said resource administrator of said dedicated architecture manager.

According to an embodiment of the invention, said dedicated architecture resource manager includes an interface for exchanging information with a process manager of said dedicated architecture.

According to an embodiment of the invention, said dedicated architecture resource manager includes an interface for exchanging information with said resource administrator of said dedicated architecture manager.

According to an embodiment of the invention, said dedicated architecture resource manager includes an interface for exchanging information with a process manager of said dedicated architecture.

In the terminal, said resource request from said dedicated architecture resource manager is processed by different equipments of said terminal, such as a process manager of said dedicated architecture, a resource administrator of said dedicated architecture manager, a resource allocator and a radio interface of said terminal.

To facilitate transmission for exchanging resource information, an interface is integrated in said equipments concerned of the terminal to enable the necessary exchanges.

Each of said equipments of the terminal dialogues through said integrated interfaces with one or more other equipments of the terminal. However, said equipments do not express a request for a resource the same way; for example, a request may take the form of a request for a memory space or a request for a size of memory space. To facilitate said dialogue, said various equipments of the terminal concerned include means for translating the content of said received resource request.

According to an embodiment of the invention, said dedicated architecture resource manager includes a resource correspondence table for defining a resource corresponding to an application activated on said terminal.

As indicated above, the application activated by the user is associated with the architecture dedicated to the communications network concerned. A request for execution of said application is sent to a process manager of said dedicated architecture, which identifies the request and then sends it to the dedicated architecture resource manager.

Said dedicated architecture resource manager accesses a resource correspondence table that defines a resource corresponding to said application, for example a memory space necessary for downloading a file from a communications network to which the terminal is connected. In this way, a resource request corresponds to said activated application.

Another aspect of the invention is directed to a method of managing a resource in a terminal for an architecture dedicated to a communications network. The method includes the operations of activating an application on said terminal, a process manager of said dedicated architecture defining a resource corresponding to said application, said process manager requesting said resource of a dedicated architecture resource manager, said dedicated architecture resource manager responding after checking said resource request, a resource administrator of a dedicated architecture manager responding after checking said resource request, a resource allocator of said terminal allocating a resource, a radio interface for access to said communications network allocating a resource, said dedicated architecture resource manager associating said resources with said application after validation, and said process manager executing said application by means of said resource.

Each of said equipments concerned of the terminal receives said resource request corresponding to said activated application. Each of said equipments of the terminal checks the feasibility and compatibility of said resource request.

Said process manager manages all the applications executed in a dedicated architecture. Said dedicated architecture resource manager manages all requests for resources of a dedicated architecture. Said dedicated architecture manager resource administrator manages all requests for resources requested by a said dedicated architectures. Said resource allocator of the terminal manages the available resources of said terminal. Said radio interface manages exchanges with the mobile network and said communications network. After validation of these various equipments, said application is executed using said allocated resource.

Some of the steps of said method of the invention may be omitted as a function of the nature of said application and the technological complexity of said terminal, or for reasons of simplicity or economy, for example in terms of processing time on the terminal.

However, the smaller the number of steps, the higher the probability of significant incompatibility between a resource request and the processing carried out by the terminal to allocate said resource.

Said dedicated architecture manager allocates a dedicated architecture to each of said communications networks, offering the possibility of simultaneous but different and independent management. Said resource administrator of said dedicated architecture manager centralizes all requests for resources requested by the various dedicated architectures.

Because the various dedicated architectures operate separately and autonomously, the operation of said terminal can be adapted to the communications network to which it is connected. For example, there may be functions on one communications network that do not exist on another communications network.

Because of the increased number of services accessible via communications networks, the autonomy of each dedicated architecture in particular allows assignment of specific resources that differ from one communications network to another, for example specific applications, a specific memory space or a specific quality of service.

DETAILED DESCRIPTION OF THE DRAWINGS

To simplify the description, the equipment connected to the mobile telecommunications network is shown as a terminal 10, but may be of different kinds, for example a server, a mobile communications terminal, or a personal computer (PC).

Figure 1:
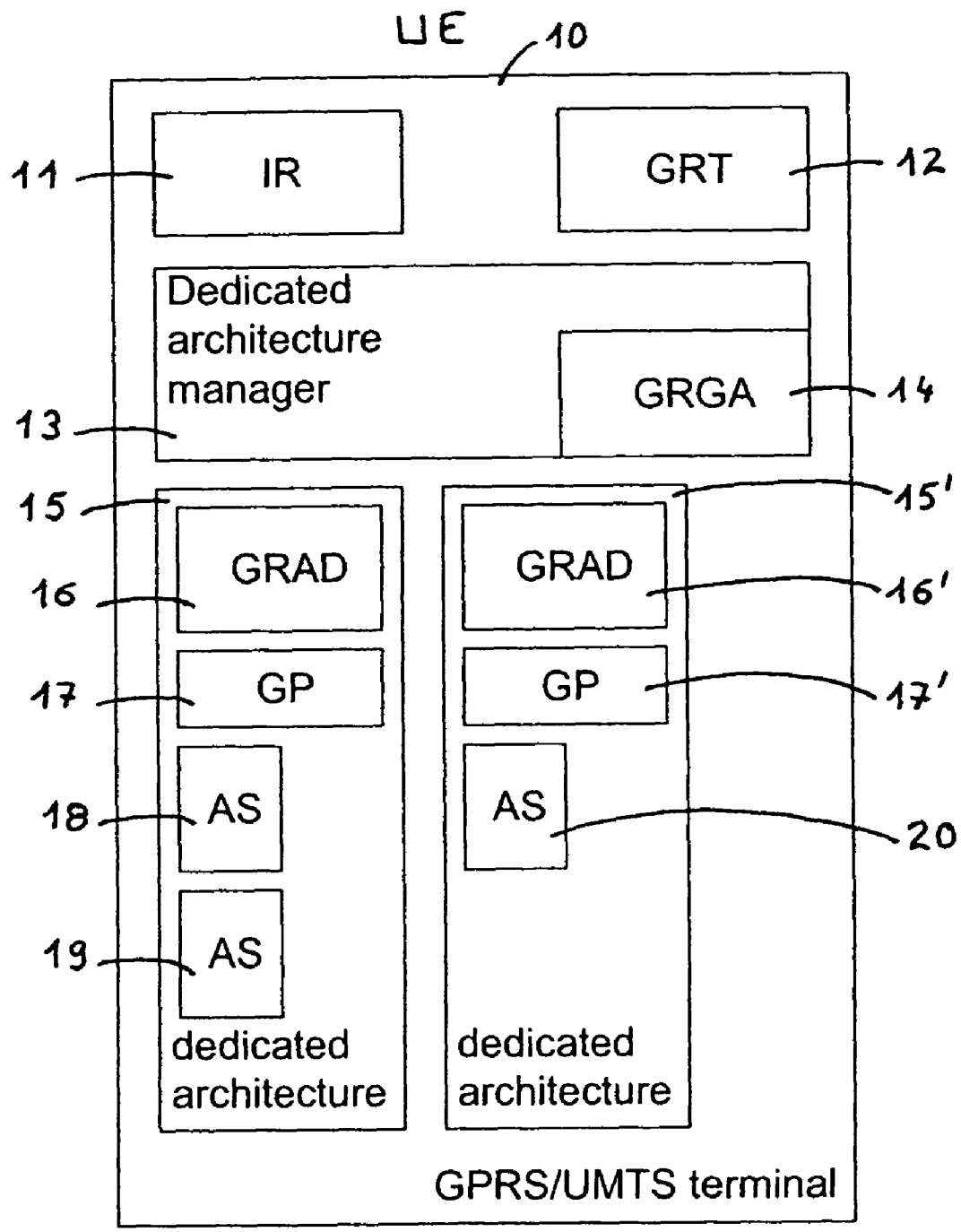
FIG. 1 is a diagram of the general architecture of a system of the invention for managing a resource in a terminal for an architecture dedicated to a communications network.

In FIG. 1, which is an overall representation of a system for managing a resource in a terminal 10 for an architecture 15, 15' dedicated to a communications network, the terminal 10 is a user equipment (UE).

Whichever kind of terminal 10 is used, it is connected to a public mobile network to which the user is a subscriber.

At present, if the user of the terminal 10 wishes to access a communications network offering a set of services to which the user requires access, the user uses a radio station of the mobile network to send an APN identifying the communications network.

To do this, the user accesses a list of APNs identifying the communications networks to which the user is a subscriber and can access, for example via a user interface in a dedicated architecture manager 13. The ETSI standard provides for a plurality of connections to be set up simultaneously to different communications networks from the same terminal and, amongst other things, the list of APNs enables a plurality of APNs to be managed in the terminal.

In the mobile network, a GGSN equipment sets up the connection to the selected communications network. A PDP context link is set up across the mobile network to the communications network. This PDP context link enables the terminal 10 to access the communications network. The GGSN then sends an address to the terminal 10 that identifies the terminal 10 in the communications network to which it has been connected.

The dedicated architecture manager 13 in the terminal 10 receives the address. It allocates a dedicated architecture 15, 15' to the connected communications network, which network 15, 15' is associated with the PDP context link that enables access from the terminal 10 to said communications network.

The connection steps referred to above are repeated each time that the user of the terminal 10 wishes to access a new communications network. The dedicated architecture manager 13 in the terminal 10 then allocates a new dedicated architecture 15, 15' to each new communications network connected.

If the user of the terminal 10 wishes to access a service accessible via one of the communications networks, an application on the terminal 10 is activated. As a function of the service required, the application "AS" identified by numerals 18, 19, 20 can take the form of a browser for reading a web page, a video player, an analog or digital sound player, etc.

In the terminal 10, the application 18, 19, 20 is associated with the architecture 15, 15' dedicated to the communications network concerned. A request for execution of the application 18, 19, 20 is sent to a process manager "GP" 17, 17' of the dedicated architecture 15, 15', which allocates an identifier to the request to execute the application 18, 19, 20.

The process manager 17, 17' manages all the applications executed in the dedicated architecture 15, 15' and allocates to each resource request an identifier that becomes effective when the resource request is validated.

The process manager 17, 17' sends a resource request corresponding to the application 18, 19, 20 to a dedicated architecture resource manager "GRAD" 16, 16'.

In the dedicated architecture 15, 15', the dedicated architecture resource manager 16, 16' manages the applications 18, 19, 20 associated with the dedicated architecture 15, 15' and activated by the user of the terminal 10, and requests for resources needed by existing applications.

The dedicated architecture resource manager 16, 16' accesses a resource correspondence table to define a resource corresponding to the application 18, 19, 20 and needed in the terminal 10 to execute the application. For example, display means, a memory space, an input-output interface, and usage time of the central processing unit (CPU) of the terminal 10 are needed in particular to open a web page.

The dedicated architecture resource manager 16, 16' checks the feasibility of the resource request. If it is not feasible, the dedicated architecture resource manager 16, 16' rejects the resource request.

To facilitate the exchange of information between the process manager 17, 17' and the dedicated architecture resource manager 16, 16', a transmission interface for exchanging information is integrated in both managers 16, 16', 17, 17'.

Similarly, a transmission interface for exchanging resource information is integrated in the various equipments concerned of the terminal 10 to enable the necessary exchanges.

What is more, not all the equipments of the terminal 10 express resource requests in the same way. For example, the application 18, 19, 20 may simply request a memory space but the dedicated architecture resource manager 16, 16' may understand a request for memory space only in the form of a request for the necessary size of memory space, such as a request for 150 kbytes of memory space.

Consequently, each of the equipments concerned of the terminal 10 which dialogues via the integrated interfaces includes means for translating the content of the received resource request.

The dedicated architecture resource manager 16, 16' sends the resource request to a resource administrator "GRGA" 14 integrated in a dedicated architecture manager 13.

Management by the dedicated architecture manager 13 of the various dedicated architectures 15, 15' each associated with a different communications network enables operation of the terminal 10 as a "multi-APN" terminal.

In the dedicated architecture manager 13, the resource administrator 14 in turn checks the feasibility of the resource request corresponding to the dedicated architecture 15, 15' for the application 18, 19, 20. If it is not feasible, the resource administrator 14 rejects the resource request.

The resource administrator 14 of the dedicated architecture manager 13, which stores the list and manages the dedicated architectures 15, 15' used in the terminal 10, balances resource requests coming from the various dedicated architectures 15, 15' and regulates the allocated resources between the various dedicated architectures 15, 15'. Depending on the settings of the parameters of the terminal 10, the resource administrator 14 of the dedicated architecture manager 13 can give priority to certain applications 18, 19, 20 over others or to certain dedicated architectures 15, 15'.

Being centralized, the resource administrator 14 of the dedicated architecture manager 13 avoids calls to the mobile network and the communications network concerned, in particular if the resource request is incompatible with the capacities of the terminal 10 or with the characteristics of the APN corresponding to the communications network.

The resource administrator 14 of the dedicated architecture manager 13 centralizes and updates resource requests coming from different dedicated architectures 15, 15' to facilitate resource management, in particular on closing an application 18, 19, 20 or a dedicated architecture 15, 15'.

The resource administrator 14 of the dedicated architecture manager 13 sends the resource request to a resource allocator 12 integrated in the terminal 10 to reserve a resource corresponding to the resource request.

The resource allocator 12 manages the various resources of the terminal 10, such as memory space, an input-output interface, display means, and CPU time on the central processing unit of the terminal 10.

The resource administrator 14 of the dedicated architecture manager 13 sends the resource request to a radio interface "IR" 11 to enable the mobile network to access the communications network concerned by means of the resource request.

In the terminal 10, the radio interface 11 manages communication with the mobile network and with the communications networks to which the terminal 10 is connected.

As a function of the result of the verifications, the resource administrator 14 of the dedicated architecture manager 13 confirms the reservation of resources to the resource allocator "GRT" 12 and to the radio interface 11 and confirms the execution of an access procedure to the communications network.

If the verification results are negative, the resource administrator 14 of the dedicated architecture manager 13 cancels the reservation of resources to the resource allocator 12 and to the radio interface 11, canceling execution of the access procedure to the communications network.

If the verification results are positive, the resource administrator 14 of the dedicated architecture manager 13 sends the resource request to the dedicated architecture resource manager 16, 16', which acknowledges receiving the result of the resource request.

In the dedicated architecture 15, 15' concerned, the dedicated architecture resource manager 16, 16' associates the allocated resources with the application 18, 19, 20 to which the identified resource request related.

If the resource request is rejected, the dedicated architecture resource manager 16, 16' deletes all references to the resource request.

In the dedicated architecture 15, 15', the dedicated architecture resource manager 16, 16' sends the result of the resource request to the process manager 17, 17'.

If the resource request is accepted, the process manager 17, 17' executes the application 18, 19, 20. If not, execution of the application 18, 19, 20 is cancelled.

Figure 2:
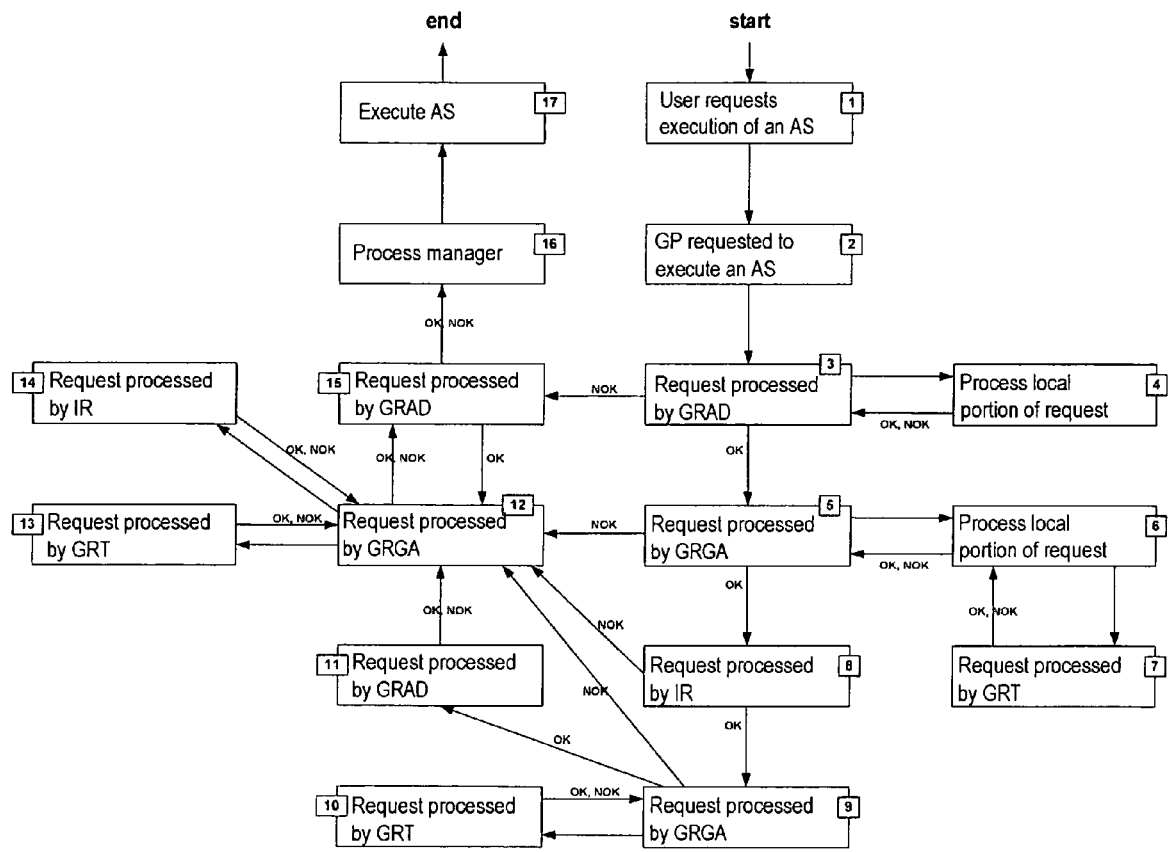
FIG. 2 represents steps of the method of the invention of managing a resource in a terminal.

To assist with understanding the invention, FIG. 2 shows the various steps of managing a resource in a terminal 10 for an architecture 15, 15' dedicated to a communications network.

When the user wishes to access a service accessible via one of the communications networks, the user activates an application 18, 19, 20 on the terminal 10 (step 1).

A request for execution of the application 18, 19, 20 is sent to the process manager 17, 17' of the architecture 15, 15' dedicated to the communications network concerned (step 2).

The process manager 17, 17' defines a resource in the terminal 10 necessary for executing the application 18, 19, 20.

The process manager 17, 17' sends a resource request corresponding to the application 18, 19, 20 to a dedicated architecture resource manager 16, 16' (step 3).

In the dedicated architecture 15, 15', the dedicated architecture resource manager 16, 16' processes a portion of the request, which is managed locally by the dedicated architecture resource manager 16, 16'.

The dedicated architecture manager 16, 16' analyses the local portion of the request to check the feasibility of the resource request (step 4)

At this stage, the dedicated architecture resource manager 16, 16' can either acknowledge the locally processed portion of the resource request by means of an acknowledgement (OK) message, reject the portion by means of a rejection (NOK) message, or modify the resource request as a function of the resources already allocated to the dedicated architecture 15, 15', for example.

A rejection (NOK) message can be sent, for example, if the dedicated architecture resource manager 16, 16' does not understand the resource request or if a problem occurs with the dedicated architecture resource manager 16, 16' processing the resource request.

As previously mentioned, at least one transmission interface for exchanging information is integrated in the process manager 17, 17' and the dedicated architecture resource manager 16, 16'. Similarly, if necessary, dialogue via the integrated interfaces is facilitated by means for translating the content of the resource request.

If the analysis result is negative (NOK message) the resource request is rejected and the next step of the method of the invention is the step 15 (see below).

If the analysis result is positive (OK message), the dedicated architecture resource manager 16, 16' sends the resource request to the resource administrator 14 of the dedicated architecture manager 13 (step 5).

In the terminal 10, the resource administrator 14 of the dedicated architecture manager 13 processes a portion of the request, which is managed locally by the resource administrator 14. The resource administrator 14 of the dedicated architecture manager 13 analyses the local portion of the resource request to check the feasibility of the request (step 6).

At this stage, the resource administrator 14 of the dedicated architecture manager 13 can acknowledge the locally processed portion of the resource request by means of an acknowledgement (OK) message, reject the portion by means of a rejection (NOK) message or modify the resource request as a function of the resources already used in the terminal 10, for example.

If the analysis result is negative (NOK message), the resource request is rejected and the next step of the method of the invention is step 12 (see below).

If the analysis result is positive (OK message), the resource administrator 14 of the dedicated architecture manager 13 sends the resource request to the resource allocator 12 of the terminal 10 (step 7).

As before, the resource allocator 12 checks the feasibility of the received request and can acknowledge the resource request by means of an acknowledgement (OK) message, reject the request by means of a rejection (NOK) message or modify the resource request as a function of the resources already used in the terminal 10, for example.

If the analysis result is negative, the resource request is rejected and the resource allocator 12 sends a rejection (NOK) message to the resource administrator 14 of the dedicated architecture manager 13.

If the analysis result is positive, the resource allocator 12 reserves a resource corresponding to the resource request and sends an acknowledgement (OK) message to the resource administrator 14.

If the preceding analysis results are positive (OK messages), the resource administrator 14 of the dedicated architecture manager 13 sends the resource request to the radio interface 11 of the terminal 10 (step 8).

The radio interface 11 of the terminal 10 extracts from the resource request the parameters necessary for executing the procedure for accessing the mobile network and the communications network concerned. The procedure for accessing a communications network, which is standardized by the ETSI, reserves resources for the communications network.

The radio interface 11 of the terminal 10 receives from the communications network the result of the procedure, which is a rejection (NOK message), an acceptance (OK message) or a modification of the resource request.

The radio interface 11 of the terminal 10 sends the result to the resource administrator 14 of the dedicated architecture manager 13 (step 9).

If the message is a rejection (NOK) message, the resource request is rejected and the next step of the method of the invention is step 12 (see below).

If the result is a modification of the resource request, the resource administrator 14 sends the modified resource request to the resource allocator 12 of the terminal 10 for it to modify the reservation of resources (step 10).

The result is again either an acknowledgement (OK message) or a rejection (NOK message) sent to the resource administrator 14 of the dedicated architecture manager 13.

If the message sent is an acknowledgement (OK) message, the resource administrator 14 sends the resource request to the dedicated architecture resource manager 16, 16' (step 11).

In the dedicated architecture 15, 15', the dedicated architecture resource manager 16, 16' can acknowledge the resource request by means of an acknowledge (OK) message, reject the request by means of a rejection (NOK) message or modify the resource request.

The dedicated architecture resource manager 16, 16' sends the above result to the resource administrator 14 of the terminal 10 (step 12).

If the message is a rejection (NOK) message, the resource request is rejected and no message accepting resources is sent either to the resource allocator 12 or to the radio interface 11 of the terminal 10.

The resource administrator 14 of the terminal 10 commands the releasing of all the resources reserved for the resource allocator 12 and the radio interface 11 and abandons the network access procedure. The next step of the method of the invention is step 15 (see below).

If the message is an acknowledgement (OK) message, the resource administrator 14 sends the resource request to the resource allocator 12 for acceptance of the reservation of resources and allocation of the resources reserved for the application 18, 19, 20. The resource allocator 12 responds with a rejection (NOK) message or an OK message (step 13).

Moreover, the resource administrator 14 sends the resource request to the radio interface 11 for confirmation of the network access procedure. The radio interface 11 responds with a rejection (NOK) message, for example if the mobile network is not accessible to the terminal 10, or with an OK message (step 14).

The resource administrator 14 sends the resource request to the dedicated architecture resource manager 16, 16' (step 15).

If the message is an acknowledgement (OK) message, the dedicated architecture resource manager 16, 16' associates the resources allocated to the application 18, 19, 20 in the dedicated architecture 15, 15'.

If the request is rejected, the dedicated architecture resource manager 16, 16' deletes all references to the resource request.

The dedicated architecture resource manager 16, 16' sends the above result to the process manager 17, 17' of the dedicated architecture 15, 15' (step 16).

If the message is an acknowledgement (OK) message, the process manager 17, 17' continues the execution of the application 18, 19, 20 in the dedicated architecture 15, 15' (step 17).

If the request is rejected, the process manager 17, 17' cancels execution of the application 18, 19, 20.

Some of the steps of the method of the invention may be omitted as a function of the nature of the application 18, 19, 20 and the technological complexity of the terminal 10 or with a view to simplification or to saving processing time on the terminal 10, for example.

The smaller the number of steps, the greater the probability of a serious incompatibility between a resource request and the processing carried out by the terminal to allocate the resource.

In the case or releasing an application 18, 19, 20, the resources allocated to the application must be released at the request of the process manager 17, 17' (step 11) if execution of the application 18, 19, 20 has terminated normally or if the resources are released forcibly (step 12) by the resource allocator 12 or by the radio interface 11 or by the resource administrator 14 of the terminal 10, for example in the case of a malfunction or disconnection of the terminal 10.

In this case, a rejection (NOK) message is sent specifying the application concerned. At the end of processing, the resources are released and the execution of the application 18, 19, 20 is terminated.

The dedicated architecture manager 13 has the option of commanding opening of the dedicated architecture 15, 15' to allocate it to a communications network. To this end, the resource administrator 14 of the dedicated architecture manager 13 sends an acknowledgement (OK) message to execute a predefined resource request specifying the minimum resources enabling the dedicated architecture 15, 15' to function. This type of predefined resource request can take priority over other resource requests, for example to facilitate the opening of a new dedicated architecture 15, 15'.

In this case, the method of the invention begins with step 3. At the end of processing, the resources are allocated to the dedicated architecture 15, 15' and are managed by the dedicated architecture resource manager 16, 16' and the process manager 17, 17'.

The dedicated architecture manager 13 also has the option of commanding modification of the resources allocated to a dedicated architecture 15, 15'. To this end, the resource administrator 14 of the dedicated architecture manager 13 sends an acknowledgement (OK) message to execute a resource request specifying modification of the resources of the dedicated architecture 15, 15'.

In this case, the method of the invention begins with step 3. At the end of processing, the modified resources are allocated to the dedicated architecture 15, 15'.

The dedicated architecture manager 13 also has the option of commanding the releasing of a dedicated architecture 15, 15'. To this end, the resource administrator 14 of the dedicated architecture manager 13 sends a rejection (NOK) message specifying the dedicated architecture 15, 15'.

In this case, the method of the invention begins with step 12. At the end of processing, the resources allocated to the dedicated architecture 15, 15' are released and the dedicated architecture 15, 15' is no longer associated with a communications network in the terminal 10.

The dedicated architecture manager 13 also has the option of suspending or restoring the operation of a dedicated architecture 15, 15', i.e. momentarily suspending or restoring access from the dedicated architecture 15, 15' to the corresponding communications network. To this end, the resource administrator 14 of the dedicated architecture manager 13 sends the request to the radio interface 11.

The radio interface 11 of the terminal 10 extracts from the request the parameters necessary for executing the procedure for suspending or restoring access to the communications network concerned, which procedures are standardized by the European Telecommunication Standards Institute (ETSI). The radio interface 11 of the terminal 10 receives from the communications network the result of the procedure, which is either a rejection (NOK message) or an acceptance (OK message).

The radio interface 11 of the terminal 10 sends the result to the resource administrator 14 of the dedicated architecture manager 13. The NOK message indicates that the suspension or restoration procedure has failed. The OK message enables execution of the suspension or restoration procedure.

The invention claimed is:

1. A system for managing a resource in a multi-access point name (APN) terminal for a plurality of hardware architectures each dedicated to a corresponding one of a plurality of communications networks, wherein said system comprises;
    a plurality of dedicated hardware architectures each comprising a dedicated architecture resource manager configured to simultaneously process, on behalf of the hardware architecture, requests defined by a process manager of the hardware architecture for access to a common resource of the multi-APN terminal, the requests being generated as a function of an application activated on said multi-APN terminal, and
    a dedicated hardware architecture manager comprising a resource administrator, wherein said each architecture resource manager is configured to simultaneously dialogue with a resource administrator of a dedicated hardware architecture manager of the multi-APN terminal to manage the common resource of said multi-APN terminal based on simultaneous operational processing of said plural dedicated hardware architectures of said multi-APN terminal which are each connected to the corresponding one of said plural communications networks.

2. The system according to claim 1 for managing a resource in a multi-APN terminal for a plurality of dedicated architectures, wherein each of said plural dedicated architecture resource managers is integrated in each said plural dedicated architectures of said multi-APN terminal.

3. The system according to claim 1 for managing a resource in a multi-APN terminal for a plurality of dedicated architectures, wherein each of said plural dedicated architecture resource managers includes an interface for exchanging information with said resource administrator of said dedicated architecture manager.

4. The system according to claim 1 for managing a multi-APN terminal for a plurality of dedicated architectures, wherein each of said plural dedicated architecture resource managers includes an interface for exchanging information with the process manager of each of said plural dedicated architectures.

5. The system according to claim 1 for managing a resource in a multi-APN terminal for a plurality of dedicated architectures, wherein said resource administrator of said dedicated architecture manager of the multi-APN terminal includes an interface for exchanging information with a resource allocator of said multi-APN terminal.

6. The system according to claim 1 for managing a resource in a multi-APN terminal for a plurality of dedicated architectures, wherein said resource administrator of said dedicated architecture manager of the multi-APN terminal includes an interface for exchanging information with a radio interface.

7. The system according to claim 1 for managing a resource in a multi-APN terminal for a plurality of dedicated architectures, wherein each of said plural dedicated architecture resource managers includes a resource correspondence table for defining the resource corresponding to the application activated on said multi-APN terminal.

8. A method of managing a resource in a multi-access point name (APN) terminal for a plurality of architectures each dedicated to and connected to a corresponding one of a plurality of communications networks, the method comprising:
    activating an application on said multi-APN terminal;
    defining, at process managers each associated with a corresponding one of said plural dedicated architectures, a common resource corresponding to said application;
    requesting, at one of said process managers, access to said common resource through a corresponding one of a plurality of dedicated architecture resource managers each associated with a corresponding one of the dedicated architectures;
    generating, at said one dedicated architecture resource manager, a response after checking said common resource access request;
    generating the response, at a resource administrator of a dedicated architecture manager of the multi-APN terminal, after checking said common resource access request against simultaneous common resource access requests from others of the plural dedicated architectures of the multi-APN terminal;
    allocating, at a resource allocator of said multi-APN terminal, the requested resource;
    allocating, at a radio interface for accessing said plural communications networks, the requested common resource;
    associating with said application, at said one of the plural dedicated architecture resource managers, access to the requested common resource after validation of the common resource access request; and
    executing, at said one process manager, said application by way of said requested common resource.

* * * * *